(12) United States Patent
Bostick et al.

(10) Patent No.: US 9,615,034 B2
(45) Date of Patent: *Apr. 4, 2017

(54) SELECTIVE BRIGHTNESS CONTROL IN PHOTOGRAPHY

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/240,181

(22) Filed: Aug. 18, 2016

(65) Prior Publication Data

US 2017/0019610 A1    Jan. 19, 2017

Related U.S. Application Data

(63) Continuation of application No. 15/139,404, filed on Apr. 27, 2016, now Pat. No. 9,471,968, which is a
(Continued)

(51) Int. Cl.
*G06K 9/40* (2006.01)
*H04N 5/243* (2006.01)
(Continued)

(52) U.S. Cl.
CPC ........... *H04N 5/243* (2013.01); *H04N 5/2256* (2013.01); *H04N 5/23222* (2013.01)

(58) Field of Classification Search
CPC ........... H04N 1/00177; H04N 5/23216; H04N 5/2354; H04N 9/3155; H04N 9/3179; G06T 7/408; G06K 9/2027; G06K 9/4661
See application file for complete search history.

(56) References Cited

U.S. PATENT DOCUMENTS 5,267,015 A    11/1993  Kai
5,634,149 A    5/1997   Jeong et al.
(Continued)

FOREIGN PATENT DOCUMENTS

EP    1202563 A1    5/2002
EP    2040145 A1    3/2009
EP    2065745 A2    6/2009

OTHER PUBLICATIONS

Foote et al., "Flycam: Practical Panoramic Video and Automatic Camera Control," Multimedia and Expo, IEEE International Conference, ICME 2000, vol. 3, DOI: 10.1109/ICME.2000.871033, 4 pages, (published before this application Aug. 2016).
(Continued)

*Primary Examiner* — Eueng-Nan Yeh
(74) *Attorney, Agent, or Firm* — L. Jeffrey Kelly

(57) ABSTRACT

A computer determines one or more brightness levels associated with a first set of pixels within a light source in an image. The computer determines a brightness effect on a second set of pixels in the image based on the one or more brightness levels associated with the first set of pixels within the light source. The computer receives input to alter at least one of the one or more brightness levels associated with the first set of pixels within the light source. The computer alters one or more brightness levels associated with the second set of pixels in the image based on the received input and the determined brightness effect.

1 Claim, 3 Drawing Sheets

Related U.S. Application Data continuation of application No. 14/797,229, filed on Jul. 13, 2015.

(51) Int. Cl.
*H04N 5/232* (2006.01)
*H04N 5/225* (2006.01)

(56) References Cited

U.S. PATENT DOCUMENTS

| | | | |
|---|---|---|---|
| 6,366,270 B1 | 4/2002 | Evanicky | |
| 7,176,976 B2 | 2/2007 | Easwar | |
| 7,936,374 B2 | 5/2011 | Cutler | |
| 8,300,132 B2* | 10/2012 | Tanaka | H04N 3/1562 348/312 |
| 8,736,685 B1 | 5/2014 | Dorenbosch | |
| 9,471,968 B1 | 10/2016 | Bostick et al. | |
| 2002/0118182 A1 | 8/2002 | Luther Weindorf | |
| 2003/0098914 A1 | 5/2003 | Easwar | |
| 2005/0174473 A1 | 8/2005 | Morgan et al. | |
| 2006/0017831 A1 | 1/2006 | Tanaka | |
| 2006/0082677 A1 | 4/2006 | Donomae et al. | |
| 2008/0055228 A1* | 3/2008 | Glen | G09G 3/3406 345/102 |
| 2008/0165116 A1* | 7/2008 | Herz | G09G 3/3406 345/102 |

OTHER PUBLICATIONS

Duriscoe et al., "Measuring Night-Sky Brightness with a Wide-Field CCD Camera," Publications of the Astronomical Society of the Pacific, vol. 119, Feb. 2007, pp. 192-213.

Bychkovsky et al., "Learning Photographic Global Tonal Adjustment with a Database of Input / Output Image Pairs," IEEE Computer Vision and Pattern Recognition (CVPR), Jun. 2011, Colorado Springs, CO, pp. 97-104.

CCTV.LK, "Closed-Circuit Television Systems Sri Lanka," http://www.cctv.lk/Articles/Technical/Infra_Red_Illumination.php, accessed on Jan. 30, 2015, pp. 1-18.

East Coast Pixels, "PhotoMotion-Create captivating videos with your photos," http://www.eastcoastpixels.com/cgi-bin/product.php?p=6, accessed on Jan. 26, 2015, pp. 1-3.

Easy Basic Photography, "Digital Camera Metering Modes," http://easybasicphotography.com/digital-camera-metering-modes.html, accessed on Jan. 26, 2015, pp. 1-2.

Maentz, "Light Stalking—improve your photography with us," http://www.lightstalking.com/dynamic-images-local-adjustments/, accessed on Jan. 26, 2015, pp. 1-13.

Cumblidge, "Multi-spot metering—which cameras do this?," photo.net, Feb. 26, 2 2014, http://photo.net/modern-film-cameras-forum/00cPjl, accessed on Jan. 26, 2015, pp. 1-3.

Winston, "Multi-Spot Metering with Mark III Cameras," Canon, Mar. 28, 2011, http://learn.usa.canon.com/resources/articles/2011/multispot_metering_markiii_cameras_article.shtml, pp. 1-3.

Ness, "Selective Brightness to Recover Detail," Photo Elements Techniques, Jun. 2, 2011, http://www.photoshopelementsuser.com/blog/selective-brightness-to-recover-detail/, accessed on Jan. 30, 2015, pp. 1-11.

Elixxier Software, "set.a.light 3D-Successful photo shooting every time, even before you have the camera in your hands!," https://www.elixxier.com/en/products/setalight3d.php, accessed on Jan. 30, 2015, pp. 1-8.

Bostick et al., Pending U.S. Appl. No. 14/797,229, filed Jul. 13, 2015, entitled: "Selective Brightness Control in Photography," pp. 1-28.

Pending U.S. Appl. No. 15/299,545, filed Oct. 21, 2016, entitled: "Selective Brightness Control in Photography", 20 pages.

IBM: List of IBM Patents or Patent Applications Treated as Related (Appendix P), Dated Nov. 3, 2016, 2 pages.

* cited by examiner

SELECTIVE BRIGHTNESS CONTROL IN PHOTOGRAPHY

TECHNICAL FIELD

The present invention relates generally to manipulation of potential photographs, and more particularly to selective brightness control in potential photographs.

BACKGROUND

Photography has become a major form of human expression over the past several decades and technology has been leading the way in helping us develop clearer and more aesthetically pleasing photos. The development of digital photo technology has catapulted the quality of photos to another stratosphere, allowing the entire photo to be manipulated by utilizing filters, controlling tint, brightness, color, and other various factors. In today's day and age, a photo can be taken and altered in ways never dreamed of a decade ago.

SUMMARY

The present invention provides a method, system, and computer program product for altering the brightness level of a pixel. A computer determines one or more brightness levels associated with a first set of pixels within a light source in an image. The computer determines a brightness effect on a second set of pixels in the image based on the one or more brightness levels associated with the first set of pixels within the light source. The computer receives input to alter at least one of the one or more brightness levels associated with the first set of pixels within the light source. The computer alters one or more brightness levels associated with the second set of pixels in the image based on the received input and the determined brightness effect.

DETAILED DESCRIPTION

Embodiments of the present invention will now be described in detail with reference to the accompanying Figures.

Figure 1:
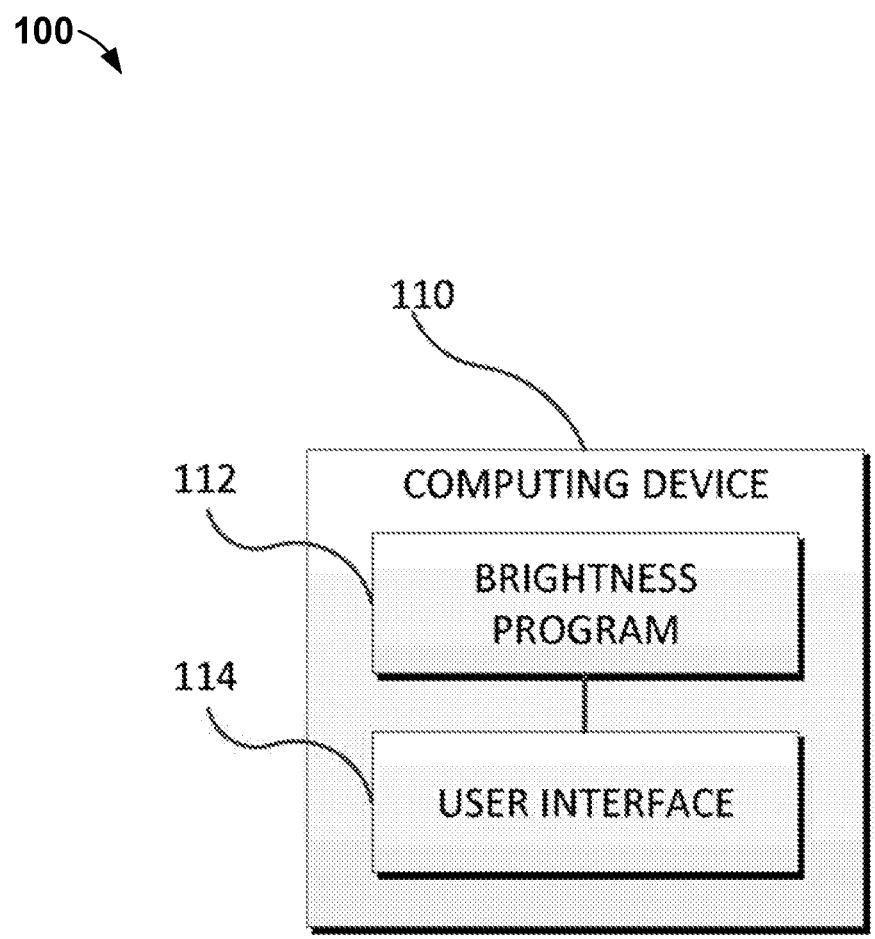
FIG. 1 illustrates a brightness control system, in accordance with an embodiment of the invention.

FIG. 1 illustrates brightness control system 100, in accordance with an embodiment of the invention. In an exemplary embodiment, brightness control system 100 includes computing device 110, however, in other embodiments, brightness control system may include multiple computing devices all interconnected via a network.

Computing device 110 includes brightness program 112. In the example embodiment, computing device 110 is a camera. However, in other embodiments, computing device 110 may be a desktop computer, a notebook, a laptop computer, a tablet computer, a handheld device, a smartphone, a thin client, or any other electronic device or computing system capable of receiving and sending data to and from other computing devices, via network 135. Although not shown, optionally, computing device 110 can comprise a cluster of web devices executing the same software to collectively process requests. Computing device 110 is described in more detail with reference to FIG. 3.

User interface 114 includes components used to receive input from a user and transmit the input to an application residing on computing device 110. In the example embodiment, user interface 114 uses a combination of technologies and devices, such as device drivers, to provide a platform to enable users of computing device 110 to interact with brightness program 112. In the example embodiment, user interface 114 receives input, such as user input via a touchscreen and/or textual input received from a physical input device, such as a keyboard, via a device driver that corresponds to the physical input device.

Brightness program 112 is a program capable of identifying light sources within a photo about to be taken. Furthermore, brightness program 112 is capable of determining a brightness level for each pixel of a potential photograph (for example, each pixel of a potential photograph displayed in on the LCD screen of a camera) associated with each identified light source. In the example embodiment, brightness program 112 is also capable of providing a user of computing device 110 with the option to increase or reduce the brightness of any of the identified light sources. The operations and functions of brightness program 112 are described in more detail with reference to FIG. 2.

Figure 2:
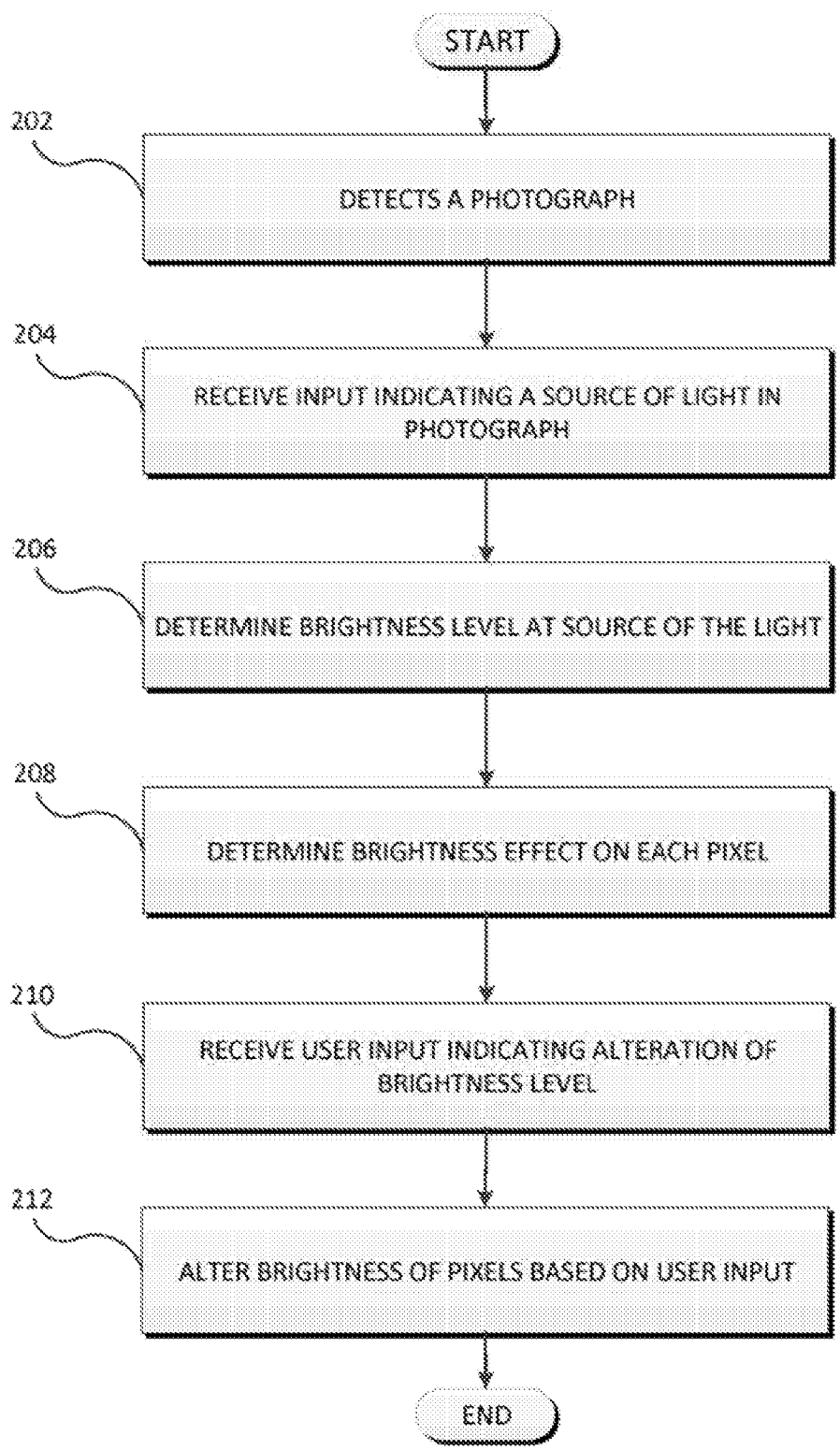
FIG. 2 is a flowchart illustrating the operations of the brightness control program of FIG. 1 in determining a brightness level for each pixel in a potential photograph and the amount of the brightness level attributable to a light source in the potential photograph, in accordance with an embodiment of the invention.

FIG. 2 is a flowchart illustrating the operations of brightness program 112 in determining a brightness level for each pixel in a potential photograph/image and the amount of the brightness level attributable to a light source in the potential photograph. In the example embodiment, brightness program 112 detects a potential photograph that is about to be taken by the user of computing device 110 (step 202). In the example embodiment, brightness program 112 may communicate with the operating system of computing device 110 in order to determine that a potential photograph is being displayed on an LCD screen of computing device 110. In this example embodiment, brightness program 112 determines that a potential photograph is about to be taken if the LCD screen is on and photographic software (present on computing device 110) is focused on an object or area for a period of time exceeding a threshold value. In the example embodiment, the threshold value is 3 seconds, however, in other embodiments, the threshold value may be another value. In further embodiments, brightness program 112 may determine that a potential photograph is about to be taken if the LCD screen is on, which is determined by way of communication with the operating system of computing device 110, as described above.

Brightness program 112 receives user input via user interface 114 indicating one or more sources of light in the potential photograph (step 204). In the example embodiment, brightness program 112 receives a user selection of one or more light sources in the potential photo by the way of the user of computing device 110 highlighting, hovering over, or selecting a light source depicted in the photograph via a touchscreen. For example, if two street lamps are present in a potential photograph, the user of computing device 110 may select or highlight one or both areas of the potential photograph which contain the street lamp(s).

Brightness program 112 determines brightness level at the source of light (or sources of light) indicated in the user input (step 206). In the example embodiment, brightness program 112 analyzes each pixel (utilizing color analysis software) associated with the light sources to determine a color value for three basic colors: red, green, and blue. In the example embodiment, a color value of 255 is the maximum value each color can have. In other embodiments, brightness program 112 may analyze each pixel for a different number of spectrum colors in order to determine a brightness value associated with each pixel. Brightness program 112 then clusters the portions of the image that have the same red/green/blue color values or substantially similar red/green/blue color values. For example, the pixels in the center of or directly around a light source in an image, such as a street lamp, may have substantially similar red/green/blue values. Therefore, brightness program 112 would cluster them together. Brightness program 112 then calculates the brightness level of each identified cluster utilizing the equation below:

$$L=\sqrt{(0.241R^2+0.691G^2+0.068B^2)} \quad (1)$$

Referring to equation 1, L is the brightness level, R is the red color value, G is the green color value, and B is the blue color value.

Brightness program 112 determines the brightness level at one or more other pixels within the potential photograph (step 208). In the example embodiment, brightness program 112 determines the brightness level at a pixel or a cluster of pixels at distance D from the source of light. Brightness program 112 determines the brightness level in the same manner as described above in step 206.

Brightness program 112 receives user input indicating an alteration of the brightness level of the indicated light source (step 210). In the example embodiment, the user of computing device 110 inputs information detailing an alteration of the brightness level of the indicated light source. For example, the user of computing device 110 may manipulate a meter displayed via user interface 114 up or down in order to increase or decrease the brightness level corresponding to the indicated light source. In other embodiments, the user of computing device 110 may input a specific value corresponding to a brightness level or select a pre-configured brightness option (i.e.—high, medium, low). For example, the user of computing device may input that he/she wishes to reduce the brightness level of the indicated light source by 15%. In this example, the brightness level at the source is reduced by 15%, therefore, if the initial brightness level was 100 lux, the altered brightness level at the source would be 85 lux. In other embodiments, the user of computing device may alter the individual color values in order to increase or reduce the brightness level at the source. In this embodiment, after alteration of the color values, brightness program 112 re-calculates the brightness level at the source by utilizing equation 1 in the same manner as described above.

Brightness program 112 determines the brightness effect on each of the one or more pixels of the potential photograph based on the alteration at the indicated light source (step 212). In the example embodiment, brightness program 112 utilizes the equation below to determine the brightness effect on each pixel of the photograph.

$$E_D = \frac{(L_{initial} - L_{altered})}{D^2} \quad (2)$$

With regard to equation 1 above, $L_{intial}$ is the initial illumination level (or brightness level) at the light source, $L_{altered}$ is the altered illumination level (or brightness level) at the light source), D is the distance between the light source and a pixel of the potential photograph, and $E_D$ is the illumination level at distance D.

In the example embodiment, the distance D is a relative distance determined based on the potential photograph. For example, for a potential photograph with a light source at point A in the potential photograph, brightness program 112 may assume that the distance between point A and another point, point B is x. Utilizing this value, brightness program 112 may determine a relative distance (a distance in terms of x) for each pixel in the photograph. Therefore, if the distance to point C from point A is 2x, and the distance to point E from point A is 4x, brightness program 112 determines an illumination level at point C and point E as shown below:

$$E(pointC) = \frac{(L_{initial} - L_{altered})}{(2x)^2} = \frac{(L_{initial} - L_{altered})}{4x} \quad (3)$$

$$E(pointE) = \frac{(L_{initial} - L_{altered})}{(4x)^2} = \frac{(L_{initial} - L_{altered})}{16x} \quad (4)$$

Brightness program 112 alters the brightness level of each pixel in the potential photograph based on the alteration of the brightness level at the indicated light source (step 214). In the example embodiment, in order to determine the amount to alter the brightness level, brightness program uses equation 5 as shown below:

$$L_D(altered)=L_D(initial)-E_D \quad (5)$$

In Equation 5, $L_D$ (altered) is the brightness level at distance D after alteration of the brightness level at the light source, $L_D$ (initial) is the brightness level at distance D prior to alteration of the brightness level at the light source, and $E_D$ is the brightness impact at distance D calculated above.

In other embodiments, brightness program 112 alters the brightness level of each pixel (based on the determined brightness effect at each pixel) proportionately to the alteration to the brightness level at the light source. In this other embodiment, brightness program 112 utilizes equation 6 below:

$$E_D = \frac{L_{initial}}{D^2} \quad (6)$$

In Equation 6, $E_D$ is the brightness impact at distance D based on the initial brightness level at the source ($L_{initial}$), and D is the distance between the light source and a pixel of the photograph, as stated above. Brightness program 112 then multiples the calculated brightness impact ($E_D$) by the percentage of increase or decrease with regard to the brightness level at the source. For example, if the brightness level at the indicated light source is decreased by 5%, brightness program 112 multiplies the determined brightness effect by 5% in order to determine the brightness effect of a pixel at distance D. Brightness program 112 then utilizes equation 5 to determine the brightness level of a pixel at distance D (after alteration at the light source). Therefore, if the determined brightness effect at a first pixel (at distance D from the indicated light source) is determined to be 10 lux, brightness program 112 decreases the brightness level at distance D by 0.5 lux).

The brightness level at a pixel may be due to multiple light sources. For example, the first pixel reference above may have a total brightness level of 100 with 10 lux attributable to the indicated light source and 90 lux attributable to another light source in the potential photograph. Therefore, if both light sources are selected, brightness program 112 may alter the brightness level based on the determined brightness effect on the first pixel from each of the light sources.

Once the brightness level are adjusted to the appropriate levels based on the input of user of computing device 110, the user of computing device 110 is given the option to take the photograph, continue adjusting, or to revert back to the original image/potential photograph.

The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claim.

Figure 3:
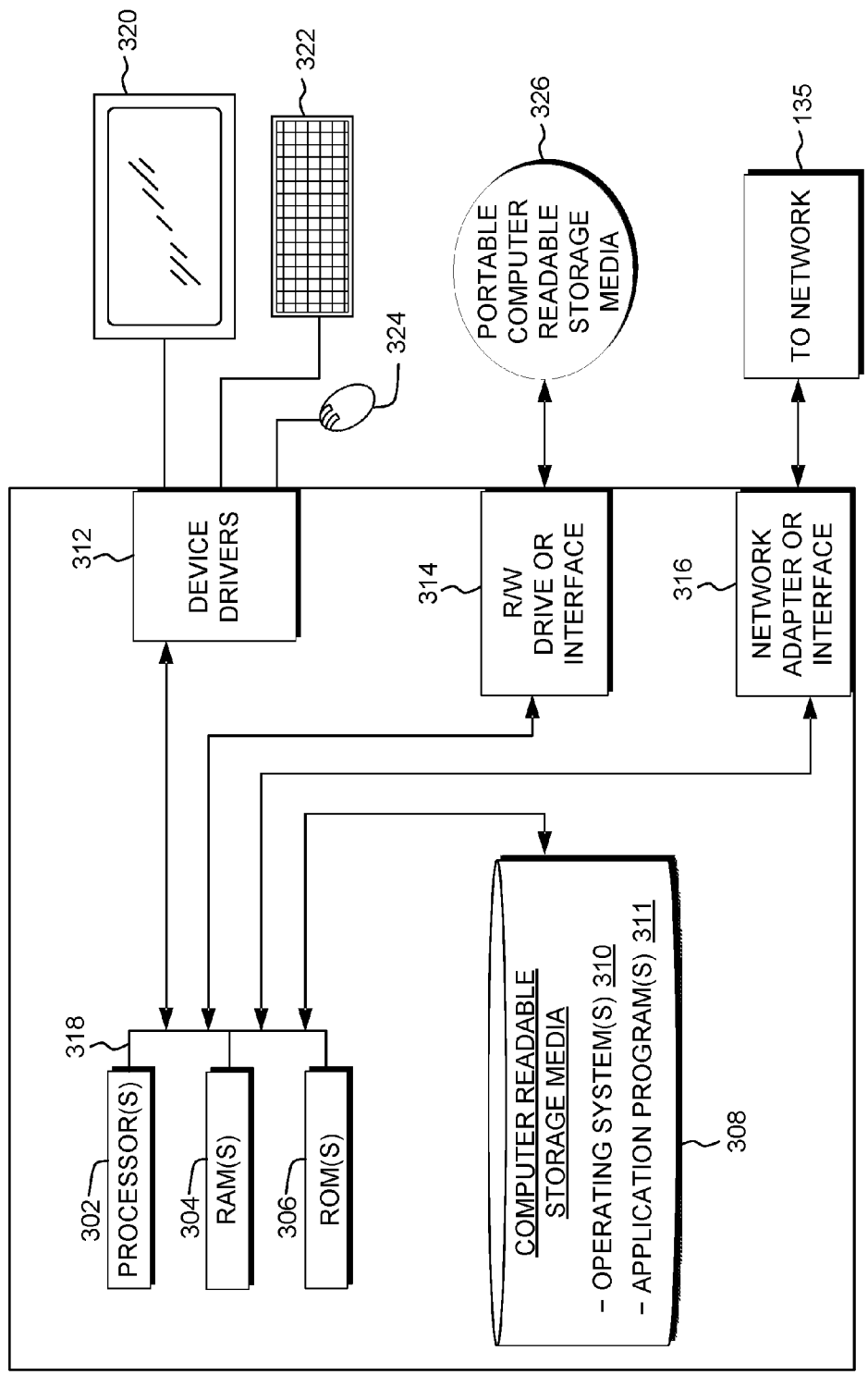
FIG. 3 is a block diagram depicting the hardware components of the brightness control system of FIG. 1, in accordance with an embodiment of the invention.

FIG. 3 depicts a block diagram of components of brightness control system 100 (i.e., computing device 110) of FIG. 1, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 may include one or more processors 302, one or more computer-readable RAMs 304, one or more computer-readable ROMs 306, one or more computer readable storage media 308, device drivers 312, read/write drive or interface 314, network adapter or interface 316, all interconnected over a communications fabric 318. Communications fabric 318 may be implemented with any architecture designed for passing data and/or control information between processors (such as microprocessors, communications and network processors, etc.), system memory, peripheral devices, and any other hardware components within a system.

One or more operating systems 310, and one or more application programs 311, for example, brightness program 112 and user interface 114, are stored on one or more of the computer readable storage media 308 for execution by one or more of the processors 302 via one or more of the respective RAMs 304 (which typically include cache memory). In the illustrated embodiment, each of the computer readable storage media 308 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 may also include a R/W drive or interface 314 to read from and write to one or more portable computer readable storage media 326. Application programs 311 on computing device 110 may be stored on one or more of the portable computer readable storage media 326, read via the respective R/W drive or interface 314 and loaded into the respective computer readable storage media 308.

Computing device 110 may also include a network adapter or interface 316, such as a TCP/IP adapter card or wireless communication adapter (such as a 4G wireless communication adapter using OFDMA technology). Application programs 311 on computing device 110 may be downloaded to the computing device from an external computer or external storage device via a network (for example, the Internet, a local area network or other wide area network or wireless network) and network adapter or interface 316. From the network adapter or interface 316, the programs may be loaded onto computer readable storage media 308. The network may comprise copper wires, optical fibers, wireless transmission, routers, firewalls, switches, gateway computers and/or edge servers.

Computing device 110 may also include a display screen 320, a keyboard or keypad 322, and a computer mouse or touchpad 324. Device drivers 312 interface to display screen 320 for imaging, to keyboard or keypad 322, to computer mouse or touchpad 324, and/or to display screen 320 for pressure sensing of alphanumeric character entry and user selections. The device drivers 312, R/W drive or interface 314 and network adapter or interface 316 may comprise hardware and software (stored on computer readable storage media 308 and/or ROM 306).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge devices. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or device. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for altering the brightness level of a pixel, comprising a computer-readable storage medium having program code embodied therewith, the program code executable by a processor of a computer to perform a method comprising:

a computer determining that an image is about to be captured by detecting that photographic software is operating and focused on the image for greater than a threshold time;

the computer receiving a first user input detailing a light source in the image;

the computer determining one or more brightness levels associated with a first set of pixels within the light source;

the computer determining a brightness effect on a second set of pixels in the image based on the determined one or more brightness levels associated with the first set of pixels;

the computer determining one or more brightness levels associated with the second set of pixels in the image;

the computer receiving a second user input to alter at least one of the one or more brightness levels associated with the first set of pixels;

the computer determining a second brightness effect on the second set of pixels based on the one or more altered brightness levels associated with the first set of pixels; and the computer altering the one or more brightness levels associated with the second set of pixels in the image based on subtracting the determined second brightness effect on the second set of pixels from the determined one or more brightness levels associated with the second set of pixels.

* * * * *